United States Patent Office 2,801,664
Patented Aug. 6, 1957

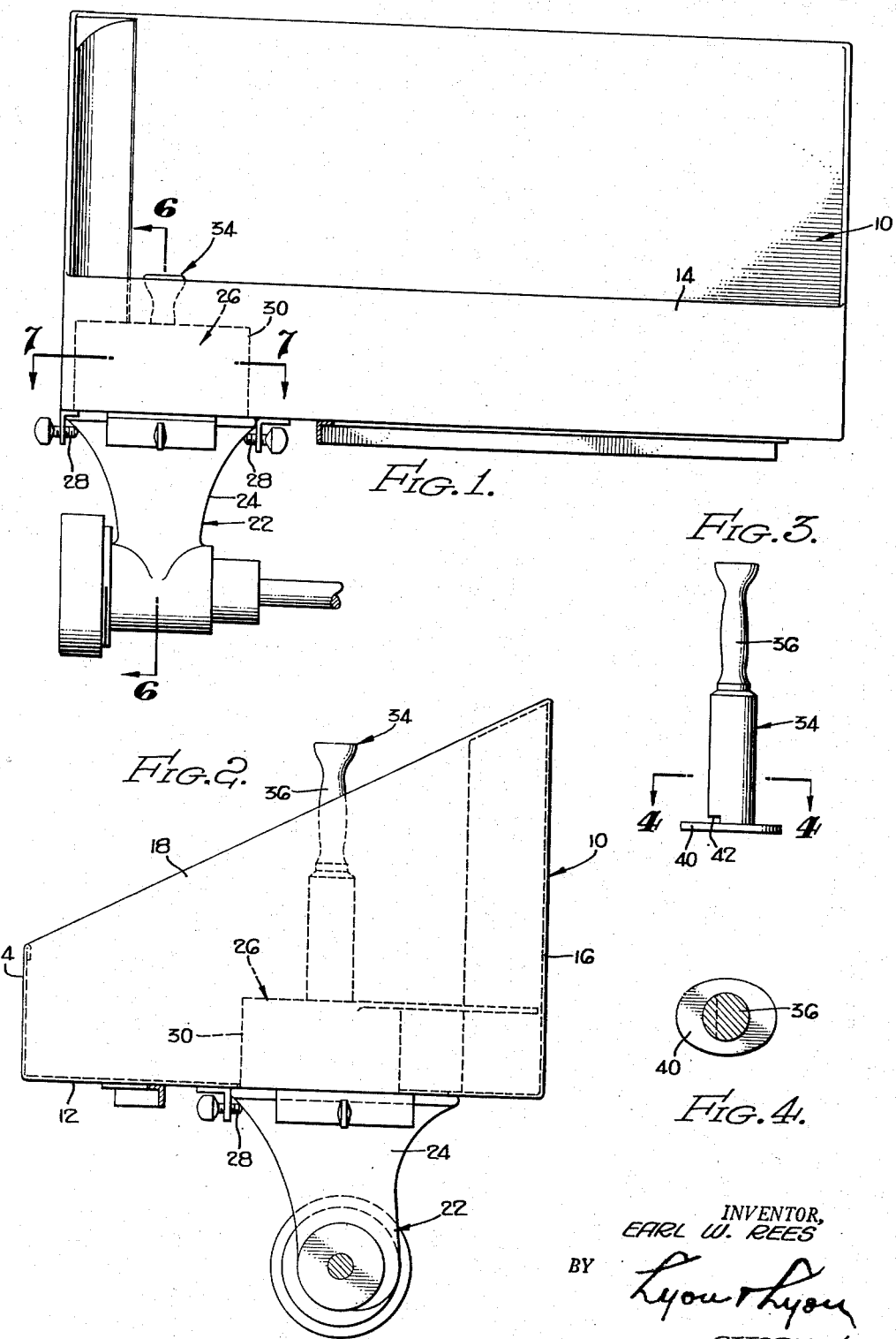

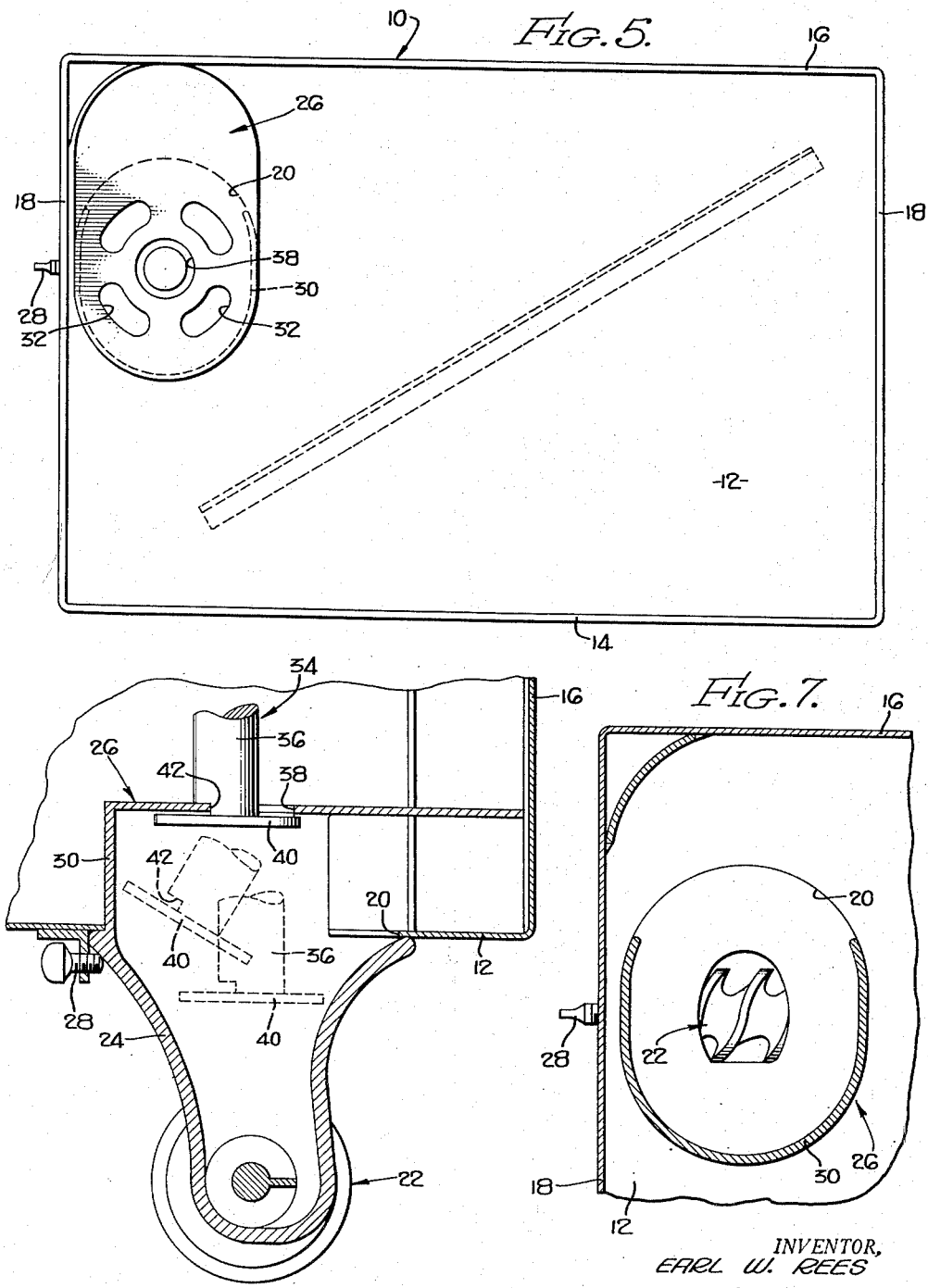

2,801,664

MEAT GRINDER AND SAFETY ATTACHMENT THEREFOR

Earl W. Rees, Norwalk, Calif.

Application May 3, 1954, Serial No. 427,087

3 Claims. (Cl. 146—182)

This invention relates to a meat grinder and a safety attachment therefor.

It is an object of this invention to provide a meat grinder wherein meat may be continuously fed to the grinder while rendering it impossible for the operator to expose his hands to the grinder.

It is still a further object of this invention to provide a grinder wherein plunger means are provided to forceably feed meat to the grinder without exposing the operator's hands thereto.

Other objects and advantages will be readily apparent from the following description.

In the drawings:

Figure 1 is a side elevation of a grinder embodying this invention.

Figure 2 is an end view of the grinder.

Figure 3 is a side elevation of the plunger.

Figure 4 is a section taken along line 4—4 of Figure 3.

Figure 5 is a top plan view of the grinder.

Figure 6 is an enlarged section taken along line 6—6 of Figure 1.

Figure 7 is a fragmentary section taken along line 7—7 of Figure 1.

The meat to be ground is delivered into the pan 10, which has a rectangular base 12, a front wall 14, a rear wall 16, which is considerably higher than the front wall and a pair of inclined side walls 18. The base 12 has a hole 20 therein through which meat is delivered to a grinder 22 which may be of any type well known to those skilled in the art as for example illustrated and described in Gasser Patent No. 2,051,554. Such a grinder has a funnel-shaped upper section 24, which communicates with hole 20, so that meat fed from pan 10 passes through hole 20 to the grinder. To prevent the butcher's hands from being exposed to the grinder the safety shield 26 is provided. In this embodiment the shield is mounted upon the funnel section 24 of the grinder 22 and hence removable from the pan with the grinder by loosening nuts 28 spaced around the periphery of funnel section 24. The shield is supported above the level of the bottom 12 of the pan by the wall 30. The height of wall 30 is substantially the same as the width of the hand and the wall extends around the periphery of hole 20, and is open at the back of hole 20. The shield 26 extends beyond the exposed portion of hole 20. Thus the butcher cups meat to be ground in the palm of his hand and moves it along the base 12 of the pan, bringing the meat beneath shield 26 and delivering same to hole 20 to the grinder through the opening between the extremities of wall 30. The shield 26 is provided with a plurality of apertures 32 to permit the butcher to observe the feeding of the meat to the grinder. To apply force to the meat to insure continual feeding to the grinder a plunger 34 is provided. The plunger has a handle 36 which projects through a suitable opening 38 in shield 26 to permit manipulation of the plunger by the butcher. The plunger has a head 40 which engages the meat and handle 36 is slotted as at 42 just above head 40, which slot is slightly larger than the thickness of shield 26 to permit the plunger to be retained in the position illustrated in Figure 6, so that it does not obstruct the passage of meat to the grinder.

While what hereinbefore has been described is the preferred embodiment of this invention, it is readily apparent that alterations and modifications can be resorted to without departing from the scope of this invention and such alterations and modifications are intended to be included within the scope of the appended claims.

I claim:

1. A safety device for a meat grinding mechanism of the type having a pan, a grinder mounted upon said pan, said pan being provided with a hole permitting passage of meat through said pan to the grinder comprising: a safety shield, a wall partially surrounding said hole and supporting said shield over said hole, and a plunger projecting through said safety shield to reach meat admitted through said hole into said grinder, said plunger being slotted to receive a portion of said shield and maintain said plunger out of the path of the meat to said grinder.

2. A safety device for a meat grinding mechanism of the type having a pan, a grinder mounted upon said pan, said pan being provided with a hole permitting passage of meat through said pan to the grinder comprising: a safety shield having a plurality of inspection apertures therein, a supporting wall partially surrounding said hole and supporting said shield over said hole, and a plunger projecting through said safety shield to reach meat admitted through said hole into said grinder, said plunger being slotted to receive a portion of said shield and maintain said plunger out of the path of the meat to said grinder.

3. A safety device for a meat grinding mechanism comprising: a grinder having an upwardly extending funnel permitting passage of meat to said grinder, a safety shield, a wall partially surrounding the open end of said funnel and supporting said shield over said funnel and a plunger projecting through said safety shield, being slotted to receive a portion of said shield and maintain said plunger out of the path of the meat to said grinder.

References Cited in the file of this patent

UNITED STATES PATENTS

| | | |
|---|---|---|
| 1,876,471 | Sander | Sept. 6, 1932 |
| 2,051,554 | Gasser | Aug. 18, 1936 |

FOREIGN PATENTS

| | | |
|---|---|---|
| 241,693 | Germany | Dec. 11, 1911 |
| 274,335 | Great Britain | July 21, 1927 |